US007181509B2

(12) United States Patent
Soejima et al.

(10) Patent No.: US 7,181,509 B2
(45) Date of Patent: Feb. 20, 2007

(54) STORAGE CONFIGURATION CHANGING APPARATUS AND METHOD THEREOF

(75) Inventors: Kenichi Soejima, Odawara (JP); Yasunori Kaneda, Sagamihara (JP); Nobumitsu Takaoka, Odawara (JP)

(73) Assignee: Hitachi, Ltd., Tokyo (JP)

(*) Notice: Subject to any disclaimer, the term of this patent is extended or adjusted under 35 U.S.C. 154(b) by 701 days.

(21) Appl. No.: 10/219,339

(22) Filed: Aug. 16, 2002

(65) Prior Publication Data

US 2003/0220991 A1 Nov. 27, 2003

(30) Foreign Application Priority Data

May 21, 2002 (JP) ............................ 2002-145673

(51) Int. Cl.
*G06F 15/177* (2006.01)

(52) U.S. Cl. ...................... 709/221; 709/220; 709/224; 709/225; 709/226

(58) Field of Classification Search ................ 709/220, 709/221, 224–226
See application file for complete search history.

(56) References Cited

U.S. PATENT DOCUMENTS

| | | | | |
|---|---|---|---|---|
| 5,335,352 | A * | 8/1994 | Yanai et al. | 710/51 |
| 5,632,027 | A * | 5/1997 | Martin et al. | 711/170 |
| 5,784,702 | A * | 7/1998 | Greenstein et al. | 711/173 |
| 5,842,198 | A * | 11/1998 | Suzuki et al. | 707/2 |
| 5,872,928 | A * | 2/1999 | Lewis et al. | 709/222 |
| 5,948,062 | A * | 9/1999 | Tzelnic et al. | 709/219 |
| 6,009,466 | A * | 12/1999 | Axberg et al. | 709/220 |
| 6,058,455 | A * | 5/2000 | Islam et al. | 711/114 |
| 6,216,173 | B1 * | 4/2001 | Jones et al. | 715/705 |
| 6,253,240 | B1 * | 6/2001 | Axberg et al. | 709/223 |
| 6,263,445 | B1 * | 7/2001 | Blumenau | 726/2 |
| 6,343,324 | B1 * | 1/2002 | Hubis et al. | 709/229 |
| 6,389,422 | B1 * | 5/2002 | Doi et al. | 707/10 |
| 6,421,711 | B1 * | 7/2002 | Blumenau et al. | 709/213 |
| 6,457,139 | B1 * | 9/2002 | D'Errico et al. | 714/5 |
| 6,466,973 | B2 * | 10/2002 | Jaffe | 709/223 |
| 6,480,955 | B1 * | 11/2002 | DeKoning et al. | 713/100 |
| 6,505,268 | B1 * | 1/2003 | Schultz et al. | 711/4 |
| 6,567,774 | B1 * | 5/2003 | Lee et al. | 703/23 |
| 6,584,499 | B1 * | 6/2003 | Jantz et al. | 709/220 |
| 6,640,278 | B1 * | 10/2003 | Nolan et al. | 711/6 |
| 6,769,022 | B1 * | 7/2004 | DeKoning et al. | 709/223 |
| 6,845,395 | B1 * | 1/2005 | Blumenau et al. | 709/223 |
| 6,889,309 | B1 * | 5/2005 | Oliveira et al. | 711/203 |
| 6,904,043 | B1 * | 6/2005 | Merchant et al. | 370/402 |
| 6,944,654 | B1 * | 9/2005 | Murphy et al. | 709/223 |
| 6,957,285 | B2 * | 10/2005 | Walton et al. | 710/36 |

(Continued)

OTHER PUBLICATIONS

"Data Storage Report 2000" Nikkei Computopia separate volume pp. 016-019.

(Continued)

*Primary Examiner*—Saleh Najjar
*Assistant Examiner*—Alicia Baturay
(74) *Attorney, Agent, or Firm*—Mattingly, Stanger, Malur & Brundidge, P.C.

(57) ABSTRACT

A storage configuration is automatically changed depending on a storage configuration change schedule which is defined previously by an administrator. Moreover, it is verified whether a storage configuration can be changed or not at the time designated when the schedule is changed.

22 Claims, 15 Drawing Sheets

U.S. PATENT DOCUMENTS

| | | | | |
|---|---|---|---|---|
| 6,965,951 | B2 * | 11/2005 | Kim | 710/19 |
| 6,988,130 | B2 * | 1/2006 | Blumenau et al. | 709/213 |
| 6,988,152 | B2 * | 1/2006 | Walton et al. | 710/56 |
| 7,003,567 | B2 * | 2/2006 | Suzuki et al. | 709/224 |
| 7,051,182 | B2 * | 5/2006 | Blumenau et al. | 711/202 |
| 7,093,011 | B2 * | 8/2006 | Hirata et al. | 709/223 |
| 2005/0210137 | A1 * | 9/2005 | Taguchi | 709/227 |

OTHER PUBLICATIONS

"VERITAS NetBackup DataCenter" Data Sheet Version 4.5.
Mark Farley, "Building Storage Networks" network Professional's Library, Osborne.

* cited by examiner

FIG. 10

| TIME (10007) | ITEM (10008) | PARAMETER (10009) | |
|---|---|---|---|
| 0:00 | LUN SECURITY | LU1 IS ALLOWED TO ACCESS TO HOST-A | 10001 |
| 0:00 | SNAP SHOT | CONTENT OF LOGICAL DISK 3 IS WRITTEN INTO LOGICAL DISK 6 AS A BACK-UP | 10002 |
| 8:00 | LUN SECURITY | LU2 IS ALLOWED TO ACCESS TO HOST-B | 10003 |
| 8:00 | SNAP SHOT | CONTENT OF LOGICAL DISK 1 IS WRITTEN INTO LOGICAL DISK 4 AS A BACK-UP | 10004 |
| 16:00 | LUN SECURITY | LU3 IS ALLOWED TO ACCESS TO HOST-B | 10005 |
| 16:00 | SNAP SHOT | CONTENT OF LOGICAL DISK 2 IS WRITTEN INTO LOGICAL DISK 5 AS A BACK-UP | 10006 |

FIG. 12

| TIME ZONE (12006) | LOGICAL DISK (12007) | REQUESTED PERFORMANCE (12008) | |
|---|---|---|---|
| 0:00-8:00 | LOGICAL DISK 1 | 20msec | 12001 |
| 0:00-8:00 | LOGICAL DISK 2 | 30msec | 12002 |
| 8:00-16:00 | LOGICAL DISK 1 | 50msec | 12003 |
| 8:00-24:00 | LOGICAL DISK 2 | 30msec | 12004 |
| 16:00-24:00 | LOGICAL DISK 1 | 50msec | 12005 |

FIG. 13

| TIME ZONE (13006) | LOGICAL DISK (13007) | PREDICTED NUMBER OF ACCESSES (13008) | |
|---|---|---|---|
| 0:00-8:00 | LOGICAL DISK 1 | 300 REQUESTS/MIN | 13001 |
| 0:00-8:00 | LOGICAL DISK 2 | 500 REQUESTS/MIN | 13002 |
| 8:00-16:00 | LOGICAL DISK 1 | 80 REQUESTS/MIN | 13003 |
| 8:00-24:00 | LOGICAL DISK 2 | 20 REQUESTS/MIN | 13004 |
| 16:00-24:00 | LOGICAL DISK 1 | 50 REQUESTS/MIN | 13005 |

FIG. 14

| NUMBER OF REQUESTS (REQUESTS/MIN) 14006 | PREDICTED PERFORMANCE 14007 | |
|---|---|---|
| 0-100 | 10msec | 14001 |
| 100-200 | 30msec | 14002 |
| 200-400 | 50msec | 14003 |
| 400-1000 | 80msec | 14004 |
| MORE THAN 1000 | 200msec | 14005 |

STORAGE CONFIGURATION CHANGING APPARATUS AND METHOD THEREOF

BACKGROUND OF THE INVENTION

The present invention relates to change of storage device configuration information and particularly to change of storage device configuration information under the environment that the job profile changes with passage of time.

A storage device of the prior art is capable of introducing various internal configurations depending on users' requests. For example, in some cases, two or more physical disks are combined to configure a logical disk having improved reliability and performance without direct use of physical disks within the storage device. This technique is called RAID (Redundant Array of Inexpensive Disks) and the logical disks are called a parity group or a RAID group. In the RAID technique, a plurality of combination patterns of physical disks are used and these patterns are called as the RAID levels. These RAID levels include the RAID level 0 (also called striping) for dividing data for every constant size and sequentially writing or reading the divided data to or from a plurality of physical disks, the RAID level 1 (also called mirroring) for writing or reading the same data to or from both two physical disks and the RAID level 4 and RAID level 5 (these are different in the way of holding the redundant data) or the like for discretely storing the data to a plurality of physical disks except for only one disk and writing the redundant data for recovering the data to the physical disk to which the data is not stored even if the other physical disks generate faults and can no longer be used.

In the storage device introducing the RAID technique, a parity group is configured utilizing the RAID technique and the entire part or a part of the parity group is defined as the logical disk in such a case that the disk in the storage device is used from a client computer. The logical disk is opened for the designated client computer by the number which is designated by the designated port. A combination of the logical disk, identifier and the number to be opened is called a path, and the logical disk of which path has been defined is called a LU (Logical Unit or Logical Disk Unit). Moreover, the identifier defined to each LU is called a LUN (Logical Unit Number) or HLUN (Host Logical Unit Number). A function for limiting the access to each LU from each client computer is called a LUN Security or LUN masking. In the LUN Security, a unique number given to a network adapter of the client computer is used for identifying the client computer.

Meanwhile, a certain storage device has a function in regard to the access performance to the storage device from the client computer or to the resources such as physical disk and logical disk within the storage device. In the technique called PPC (Port Priority Control), priority of a requested process is given to each port of the storage device and the requested process accepted at the port having the higher priority is processed with priority. Moreover, in a technique called cache residency, the entire part or a part of data included in the LU are permanently reserved in the cache memory within the storage device.

There is also a technique which is called a snapshot for copying the data of logical disk within the storage to another logical disk. Moreover, some storage devices have a function not only for copying the logical disk at the designated timing but also for giving inter-relation between the logical disk as the copying source and the logical disk as the copying destination and for automatically realizing the copying operation to the copying destination when the data is written to the logical disk as the copying source.

A reference, Mark Farley, "Building Storage Networks", network Professional's Library, Osborne has been issued in regard to RAID, LUN masking and snapshot.

On the other hand, in recent years, the SAN (Storage Area Network), in which a plurality of storage devices and a plurality of client computers utilizing such storage devices are connected through a high speed network such as a fiber channel, has been gained much attention. In the SAN environment, one client computer is capable of simultaneously using two or more storage devices and one storage device may be used from two or more client computers. An example of configuration of SAN is illustrated in FIG. 1. In FIG. 1, the storage devices 1005, 1006, 1007, client computers 1002, 1003 utilizing such storage devices and a management computer 1004 used for management of storage devices are all connected through the network 1001. Here, the management computer 1004 is used to define the configuration of storage device and control the access to the storage devices connected to the network 1001. In the SAN environment in FIG. 1, an administrator executes the job on the management computer 1004 in order to change the configuration of the storage devices 1005, 1006 and 1007. When the management computer 1004 allows access in the SAN environment of FIG. 1, the client computer 1002 is capable of using all storage devices 1005, 1006 and 1007. In the same manner, the client computers 1002 and 1003 can use in common the storage device 1005.

As a reference in regard to the SAN explained above, there is the "Data Storage Report 2000", Nikkei Computopia, additional edition, 2000.

For the configuration change of a storage device such as parity group, LU, PPC, cache residency and LUN Security, a storage management program is used. This storage management program operates in the management computer connected to the SAN and terminal built in the storage device and a administrator is capable of changing configuration of storage device using this storage management program.

A certain storage management software operating in the management computer automatically executes the backup of data at the prejudged time. Moreover, such software uses in some cases the snapshot explained above to conduct such backup operation. The reference "VERITAS NetBackup DataCenter datasheet" (VERITAS Corp.) is prepared as the storage management software which can execute the backup of data at the prejudged time.

In the actual job in the SAN environment, the internal configuration required for each storage device changes from time to time. In this case, when a administrator uses the configuration in the storage device in direct without change, the optimum performance cannot be attained and the resource application efficiency of the storage device will be deteriorated. However, if a administrator executes manual job when the change of configuration of storage device is necessary, such job is considerably complicated.

Meanwhile, in the case of the storage management software for executing the backup of data at the prejudged time from the management computer, the backup operation cannot be realized as scheduled because the network between the storage device and management computer may be cut out and a fault is generated in the management computer for controlling the storage devices. Moreover, when the storage devices are shifted to the other SAN environment, it is very troublesome because it is also required to simultaneously move the storage management software in the management computer and the schedule data of the relevant software.

BRIEF SUMMARY OF THE INVENTION

It is therefore an object of the present invention to change the internal configuration of a storage device to that to be changed from time to time while the load of an administrator is alleviated. When the storage device configuration information and the configuration change schedule describing a schedule to change the configuration of storage device are stored and a request for change of the storage device configuration information or a request for change of the storage device configuration change schedule is accepted, if the request for change of the configuration change schedule is accepted, this request is verified whether it can be processed normally or not. When the request is judged to be processed normally, the configuration change schedule is changed. When the request for change of the storage device configuration information is received, the storage device configuration information is changed.

BRIEF DESCRIPTION OF THE SEVERAL VIEWS OF THE DRAWINGS

FIG. 10 illustrates an example of configuration change schedule in the first embodiment of the present invention.

FIG. 12 illustrates a requested performance table for every logical disk in the second embodiment of the present invention.

FIG. 13 illustrates a predicted access table for every logical disk in the second embodiment of the present invention.

FIG. 14 illustrates a predicted access table in the second embodiment of the present invention.

DESTAILED DESCRIPTION OF THE INVENTION

As a first embodiment, an example of automatically manipulating the storage configuration definition for LUN, Security, PPC, path, cache residency and snapshot will be explained depending on the prejudged schedule within the storage device. A configuration change schedule is generated by an administrator to indicate when the above configuration should be defined as indicated with an example of FIG. 10 which will be explained later.

Figure 1:
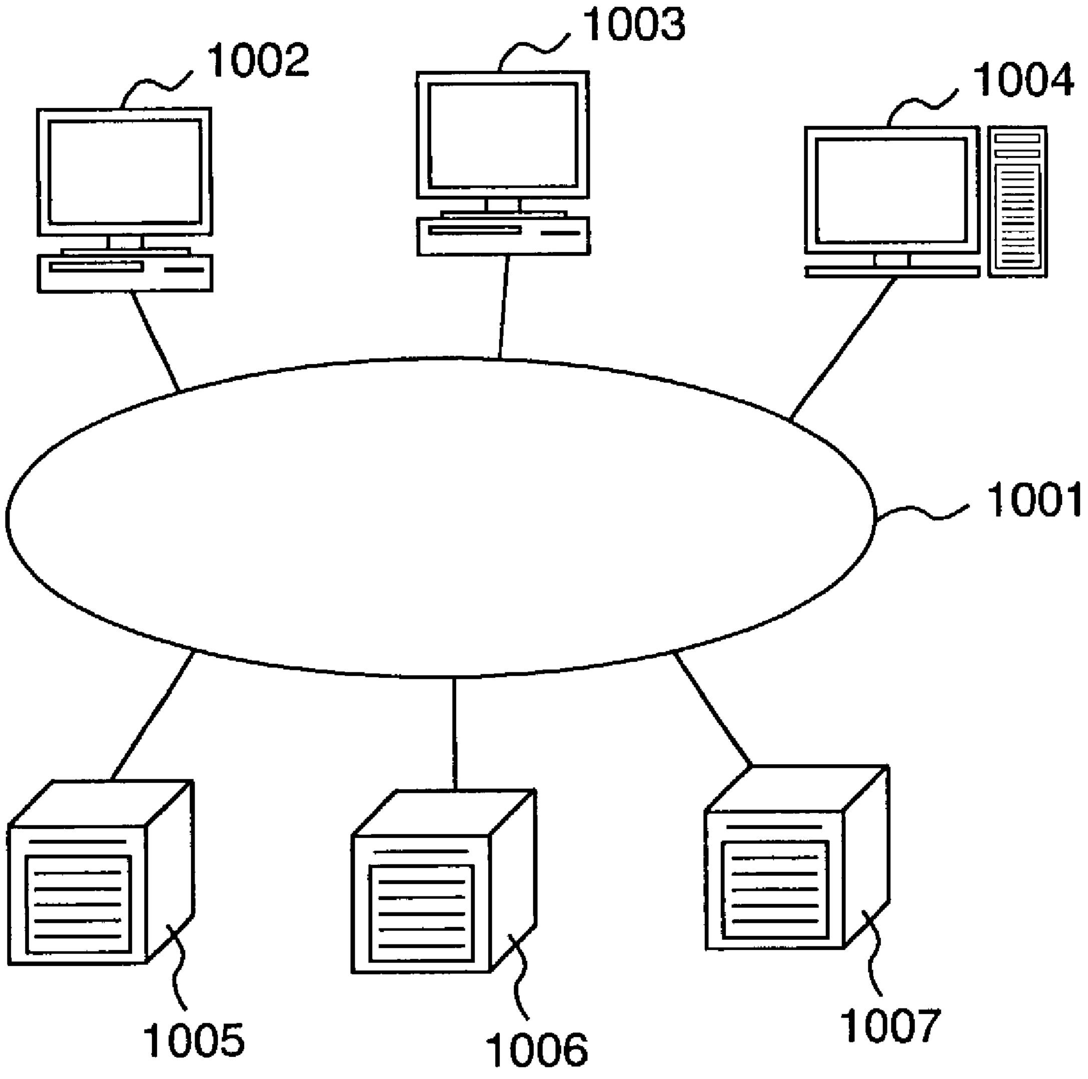
FIG. 1 illustrates an example of configuration of SAN to which the embodiment of the present invention is adapted.
Figure 2:
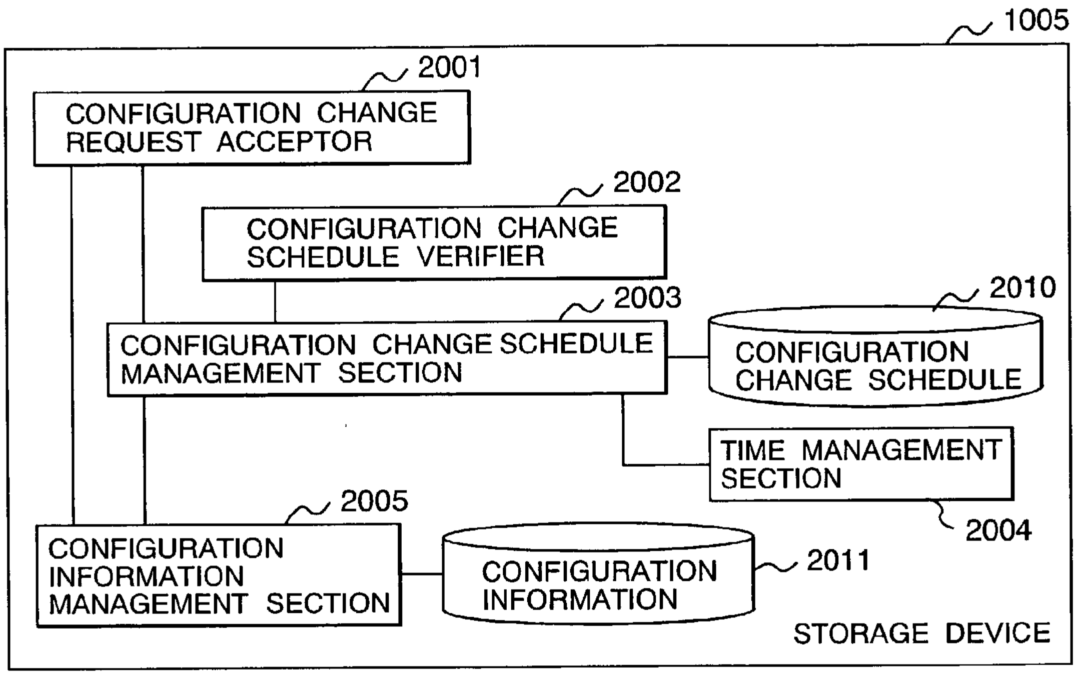
FIG. 2 illustrates a block configuration of the first embodiment of the present invention.

FIG. 2 is a block diagram for realizing this embodiment within the storage device 1005 of FIG. 1. A configuration change request acceptor 2001 receives a present configuration change request or a future configuration change schedule change request within the storage device generated by an administrator using a management computer. The configuration change schedule is generated based on the job profile which is detected by the administrator or the configuration requested by the statistically judged storage device. When the request received is the present configuration change request, the received request is then transferred to a configuration information management section 2005. When the received request requires change of the configuration change schedule, it is then transferred to a configuration change schedule management section 2003. The configuration information management section 2005 changes a configuration information 2011 in the storage device 1005 depending on the request transferred from the configuration request acceptor 2001.

On the other hand, when the configuration change schedule management section 2003 receives a configuration change schedule change request transferred from the configuration change request acceptor 2001, it is verified using a configuration change schedule verifier 2002 whether the request may be processed normally at the designated time or a disadvantage is generated because the request is reflected on a configuration change schedule 2010. When it is judged the process may be completed normally without generation of any disadvantage, it is then reflected on the configuration change schedule 2010. Moreover, the configuration change schedule management section 2003 transmits a configuration change request to a configuration information management section 2005 in co-operation with a time management section 2004, depending on the schedule written in the configuration change schedule 2010. Upon reception of a configuration change request from the configuration change schedule management section 2003, the configuration information management section 2005 changes a configuration information 2011 within the storage device 1005.

Figure 3:
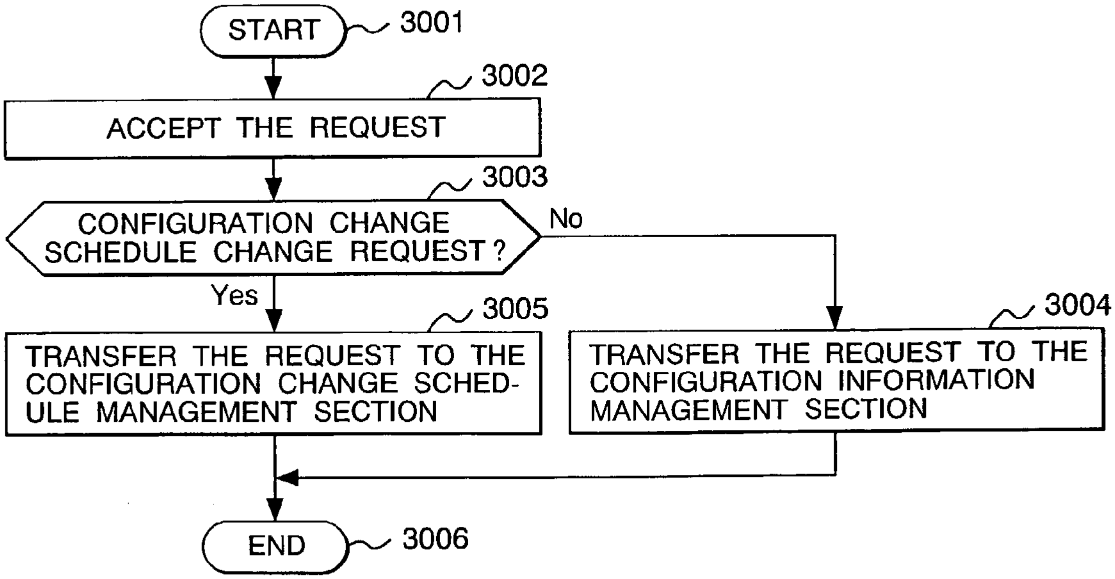
FIG. 3 illustrates a flow of the request receiving process in the first embodiment of the present invention.

FIG. 3 illustrates a flow of process when the configuration change request acceptor 2001 in FIG. 2 has received a configuration change request or configuration change schedule change request from a client computer. When the process starts (step 3001), the configuration change request acceptor 2001 accepts the process request (step 3002). In the step 3003, whether the request received is the configuration change schedule change request or not is judged. When the request is the configuration information change request, this request is then transferred to the configuration information management section 2005 in the step 3004. On the contrary, when the result of judgment in the step 3003 is the configuration change schedule change request, the request is transferred in the step 3005 to the configuration change schedule management section 2003 to complete the process (step 3006).

When the request is received in the step 3002, a parameter is also received depending on the process request. For example, in the configuration change request for PPC, a port to change priority and a priority after the change are received. In the configuration change request in regard to the cache residency, designation of LU permanently reserved in the cache and cache capacity assigned depending on the necessity and position of cache used are also received. In the configuration change request in regard to path, logical disk for defining path, port and LUN are received. In the configuration change request in regard to the LUN Security, LU, identifier of the client computer in the disclosing destination and access right which is allowed as required are received. In the configuration change request in regard to the snapshot, logical disks of the copying source and copying destination and additional information in regard to the process philosophy during the copying process, if necessary, are received.

Figure 4:
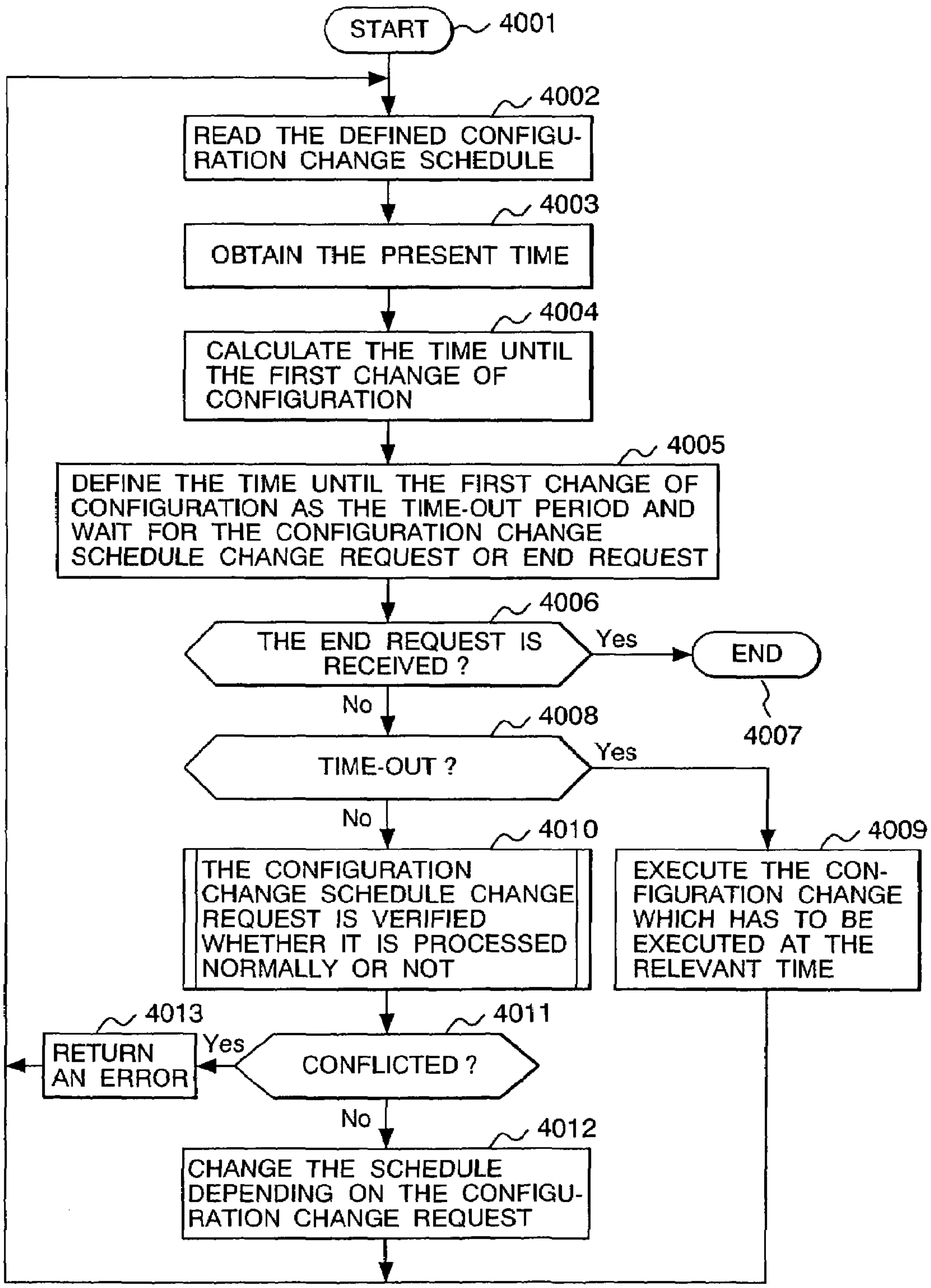
FIG. 4 illustrates a flow of the configuration change schedule change request in the first embodiment of the present invention.

FIG. 4 illustrates a flow of process in the configuration change schedule management section in the storage device 1005 of FIG. 2 to change configuration information of the storage device depending on the configuration change schedule 2010 of FIG. 2. When the process starts (step 4001), the configuration change schedule 2010 defined in the step 4002 is all read and the present time is obtained from the time management section 2004 in the step 4003. In the step 4004, the time to be processed first among the schedule read in the step 4002 is obtained in the step 4004 to calculate the time until the relevant time. In the step 4005, the time calculated in the step 4004 is defined as the time-out time, the process is stopped until the configuration change schedule change request or the process end request illustrated in FIG. 4 is issued. When the process of the step 4005 is completed, it is judged in the step 4006 whether the process is ended due to the reception of the end request or not. When the process is ended due to the reception of the end request, the process is ended (step 4007). In the step 4006, when it is judged the process in the step 4005 is ended with the reason other than the process end request, it is then judged in the step 4008 whether the process is ended in the step 4005 due to a time-out or not. When the cause is time-out, the configuration is changed as required at the relevant time in the step 4009 and the process returns to the step 4002. On the other hand, when it is judged in the step 4008 that the process of the step 4005 is ended with the cause other than time-out, it is verified in the step 4010 whether the configuration change schedule change request may be processed normally or not at the time designated by such request. When it is judged, in the step 4011, that the configuration schedule change request can be processed normally at the designated time as a result of verification in the step 4010, the configuration change schedule is changed depending on the request in the step 4012. When it is judged, as a result of such verification, that the configuration change schedule change request cannot be processed normally at the time designated by such request, an error is returned in the step 4013 to the configuration change schedule change request and the process returns to the step 4002.

Figure 5:
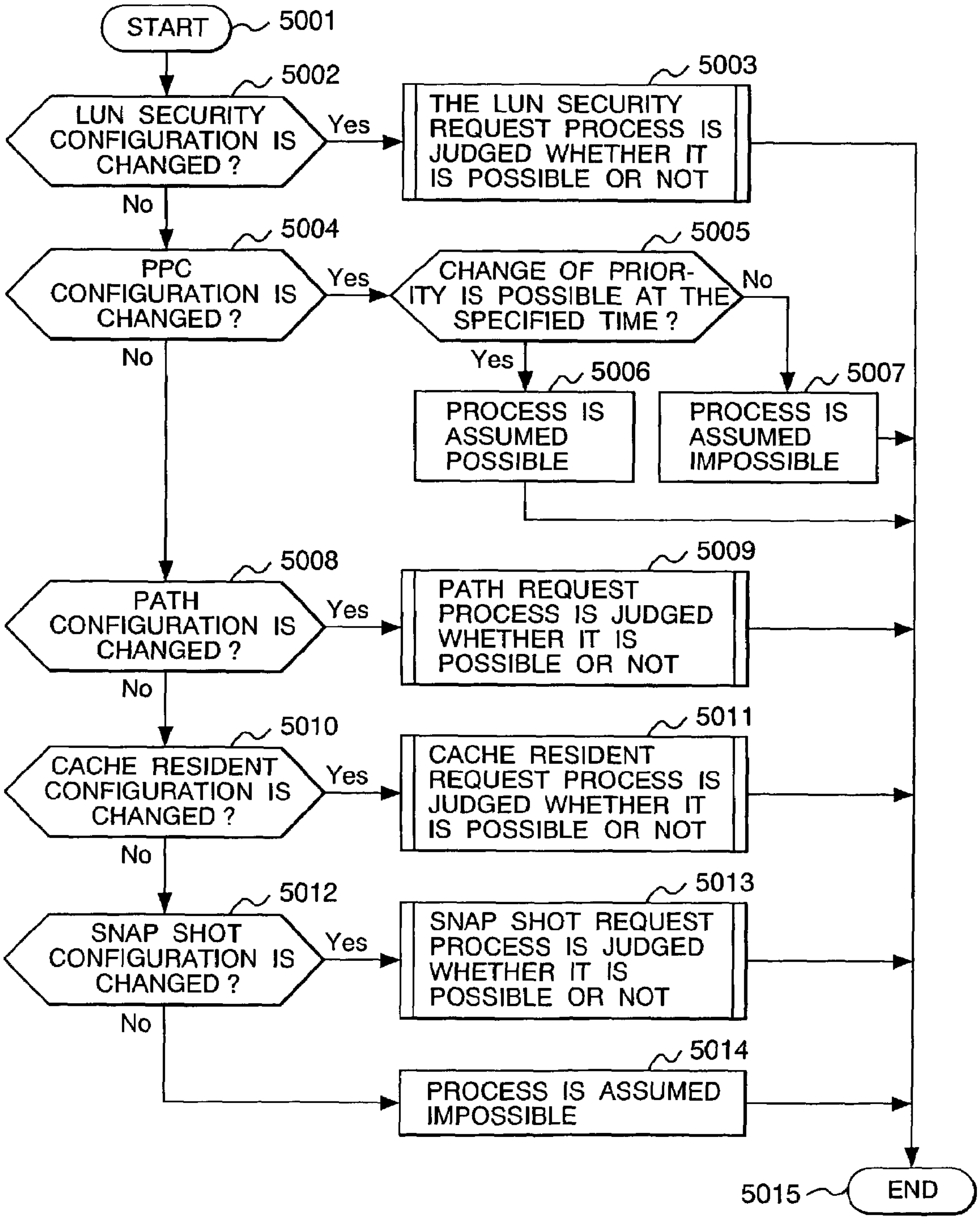
FIG. 5 illustrates a flow of the process to verify the normal operation when the configuration change schedule change request is designated in the first embodiment of the present invention.

FIG. 5 illustrates a flow of the process in the step 4010 for verifying whether the configuration change schedule change request in FIG. 4 can be processed normally at the time designated by such request. When the process starts (step 5001), the process object request is judged in the step 5002 whether it is the configuration change request for the LUN Security or not. Here, the configuration change request in FIG. 5 means a request for addition of entry of configuration change schedule, a request for deletion or a request for change. When the request is a configuration change request for the LUN Security in the step 5002, it is judged in the step 5003 whether the LUN Security request process can be executed at the designated time or not and the process is completed (step 5015) by defining the result of judgment as a result of process FIG. 5. In the step 5002, the request is judged not to be the configuration change request for the LUN Security, setting of PPC (port priority) is judged in the step 5004. When the PPC is set, it is judged in the step 5005 whether the port priority can be changed at the designated time, for example, whether the priority change is inhibited or not at the relevant time. When it is proved in the step 5005 that the priority change is possible, the relevant process is judged to be processed in the step 5006 and if priority change is impossible, the process is completed (step 5015) according to the judgment that the relevant process is impossible in the step 5007.

When it is judged in the step 5004 that the request is not the PPC configuration change request, the request is the path configuration change request or not in the step 5008. When the result of judgment is proved as the path configuration change request, it is judged in the step 5009, the request can be processed at the time designated by the request or not and the process is completed (step 5015) as a result of judgment in the process of FIG. 5.

When the request is judged not to be the path configuration change request in the step 8008, it is judged in the step 5010 that the request is the configuration change request for the cache residency or not. When the request is the configuration change request for cache residency as a result of judgment, it is then judged in the step 5011 whether the request can be processed at the time designated by the same request or not and the process is completed (step 5015) depending on the result of judgment as a result of process of FIG. 5.

When it is judged in the step 5010 that the request is not the configuration change request for the cache residency, the request is judged in the step 5012 whether it is the configuration change request for the snapshot or not. When the request is proved as the configuration change request for the snapshot, it is judged in the step 5013 whether the request can be processed or not at the time designated by the request and the process is completed (step 5015) by defining the result of judgment as a result of process of FIG. 5. When the request is judged not to be the configuration change request for the snapshot in the step 5012, the process is completed (step 5015) if it is judged in the step 5014 that the process is impossible at the designated time.

Figure 6:
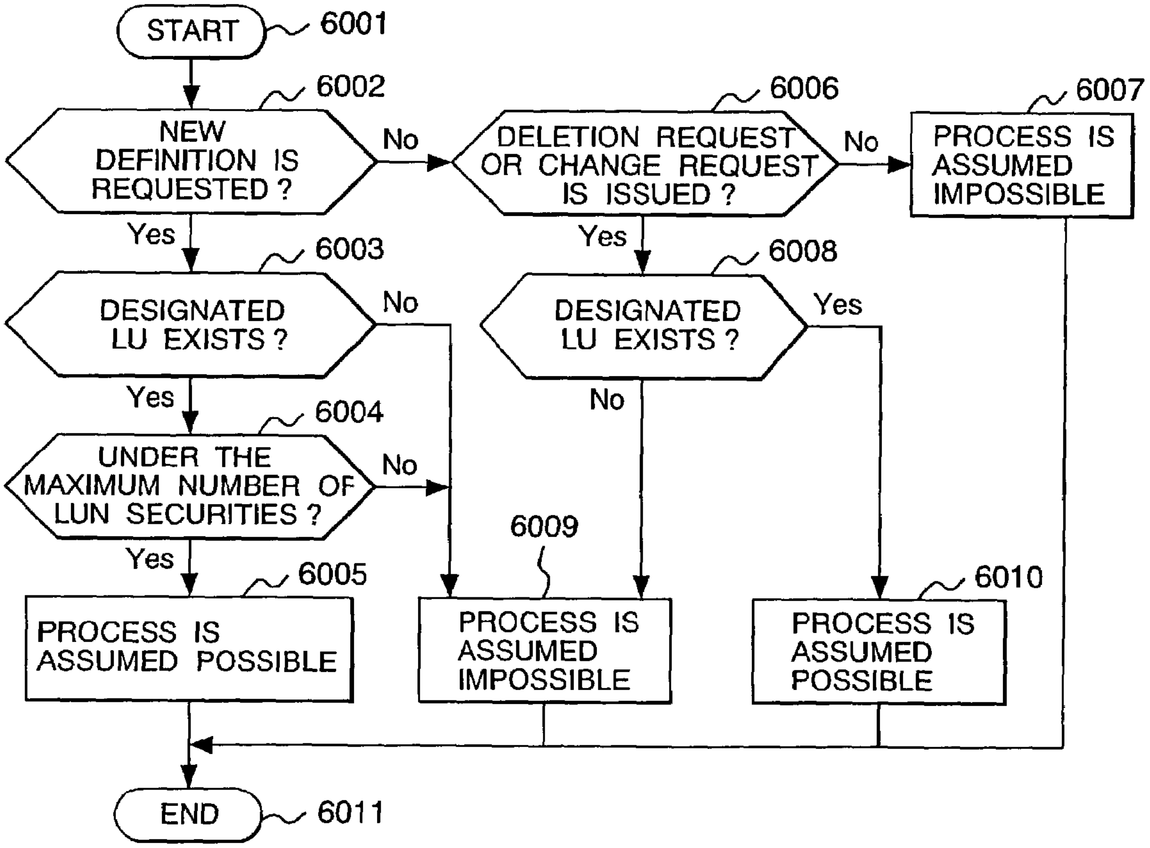
FIG. 6 illustrates a flow for judging whether the LUN Security configuration change schedule change request may be processed or not in the first embodiment of the present invention.

FIG. 6 illustrates a flow of process in the step 5003 of FIG. 5. When the process starts (step 6001), the relevant process request is judged in the step 6002 whether it is the new definition request for LUN Security or not. When the request is not the new definition request, the process is then judged in the step 6006 whether it is the deletion request or change request. When the process is not the deletion request or change request, the process is completed (step 6011) by defining the process is impossible in the step 6007. When the process is judged in the step 6006 that it is the deletion request or change request, whether the designated LU exists at the time designated in the step 6008 or not is judged. When such LU exists, the process is completed (step 6011) according to the judgment that the process is possible in the step 6010. If the designated LU does not exist in the step 6008, the process is completed (step 6011) depending on the result that the process is impossible in the step 6009. Meanwhile, when the request is judged as the new definition request in the step 6002, it is then searched in the step 6003 whether the designated LU exists at the time designated by the request. When the such LU does not exist, the process is completed (step 6011) by judging the process is impossible in the step 6009. When the designated LU exists in the step 6003, it is then searched in the step 6004 whether the number of settings of the LUN Security at the designated time is less than the maximum number of LUN Securities which can be set or not. When the number of settings is less than the maximum number of LUN Securities, the process is completed according to the judgment that the process is possible in the step 6005 and when the number of settings is not less than the maximum number of LUN Securities, the process is completed (step 6011) according to the judgment that the process is impossible in the step 6009.

Figure 7:
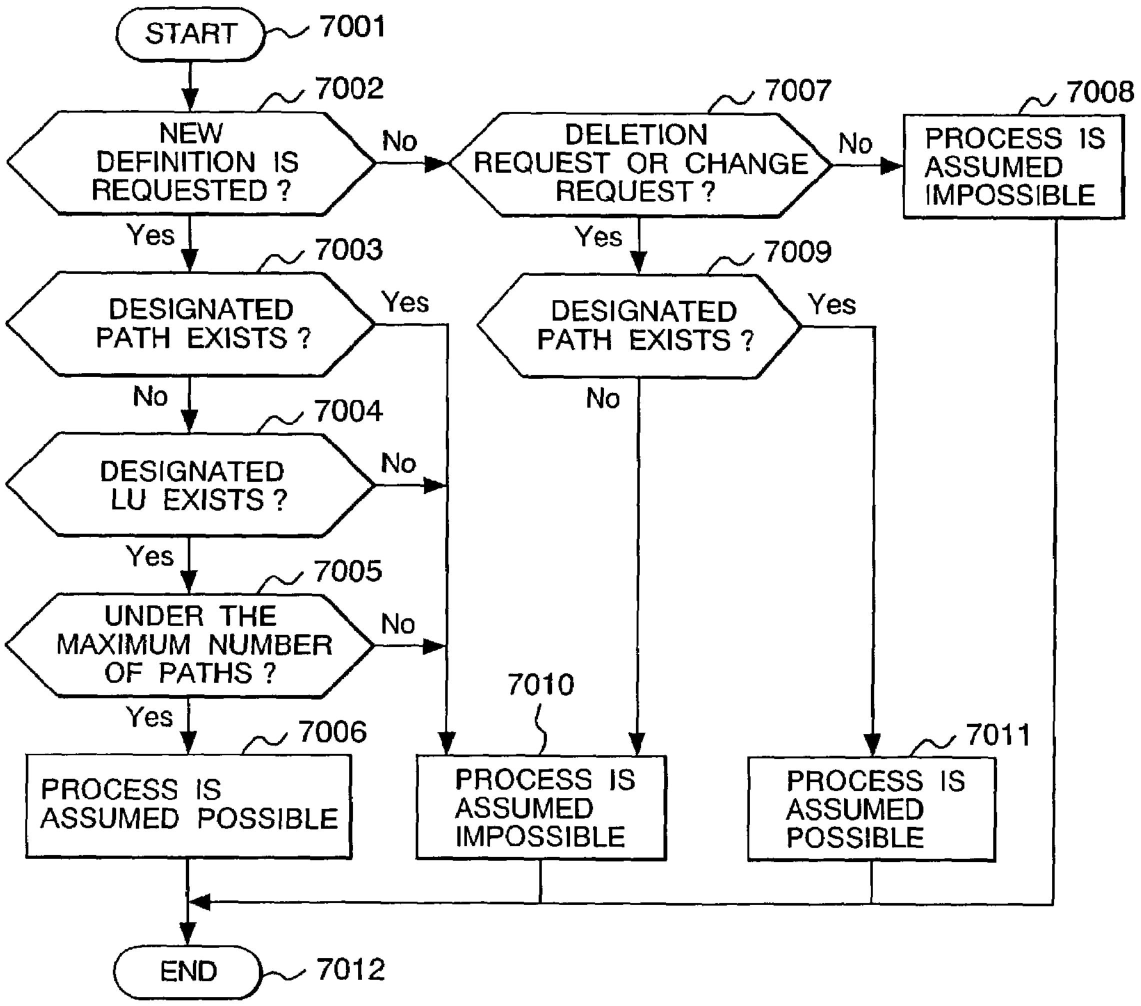
FIG. 7 illustrates a flow for judging whether the path configuration change schedule change request may be processed or not in the first embodiment of the present invention.

FIG. 7 illustrates a flow of process of the step 5009 of FIG. 5. When the process starts (step 7001), the relevant process request is judged in the step 7002 whether it is the path new definition request or not. It is judged in the step 7007 whether the request is the deletion request or change request. When the request is judged not to be deletion request or change request, the process is completed (step 7012) according to the judgment that the relevant process is impossible in the step 7008. Meanwhile, the request is judged in the step 7007 that it is the deletion request or change request, whether the path designated by the request exists or not is judged in the step 7009. When the path exists, the process is completed (step 7012) if it is judged that the process is possible in the step 7011. However, it is judged in the step 7009 that the path designated by the request does not exist, the process is completed (step 7012) according to the judgment that the process is impossible in the step 7010. On the other hand, when the process object request is judged in the step 7002 as the new definition request, whether the path designated by the request exists or not at the time designated by the request is searched in the step 7003. When such path exists, the process is completed (step 7011) if it is judged that the process is impossible in step 7010. When it is judged in the step 7003 that the path designated at the designated time does not exist, it is then searched in the step 7004 whether the LU designated at the designated time exist or not. When such LU does not exist, the process is completed (step 7012) if it is judged that process is impossible in the step 7010. When it is judged in the step 7004 that the LU designated by the request at the time designated by the request exists, it is then judged in the step 7005 whether the number of settings of path at the designated time is less than the maximum number of paths or not. When the number of settings of path is not less than the maximum number of paths, the process is completed (step 7012) if it is judged that the process is impossible in step 7010. When the number of settings of path is less than the maximum number of paths, the process is completed (step 7012) according to the judgment that the process is possible in the step 7006.

Figure 8:
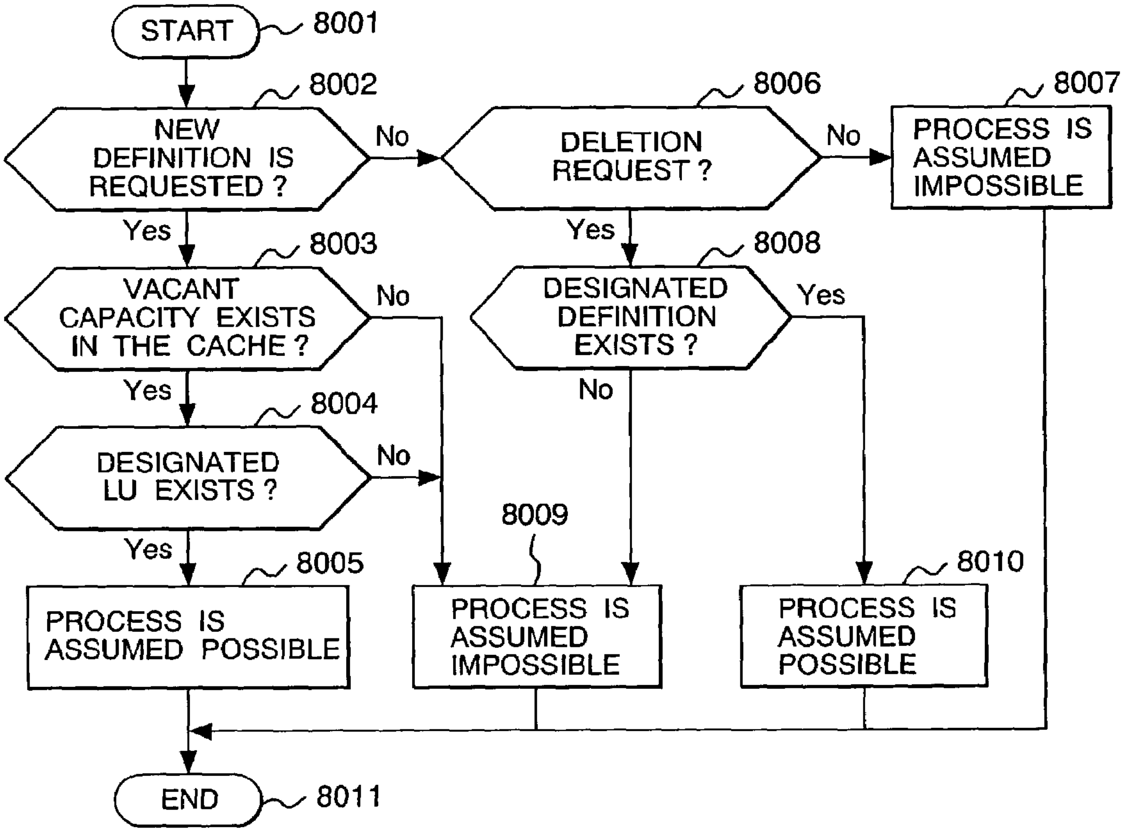
FIG. 8 illustrates a flow for judging whether the cache residency configuration change schedule-change request may be processed or not in the first embodiment of the present invention.

FIG. 8 illustrates a flow of process in the step 5011 of FIG. 5. When the process starts (step 8001), it is judged in the step 8002 whether the process is the new definition request of the information for the cache residency. When the process is judged not to be the new definition request, the process is judged in the step 8006 whether it is the deletion request for the setting of the cache residency or not. When the request is judged not to be the deletion request in the step 8006, the process is completed (step 8011) if it is judged that the process is possible in the step 8007. When the request is judged as the deletion request in the step 8006, it is then searched whether the definition designated in the step 8008 exits or not at the time designated in the request. When such request exists, the process is completed (step 8011) if it is judged that the process is possible in the step 8010. If such request does not exist, the process is completed (step 8011) when it is judged that the process is impossible in the step 8009. On the other hand, when the relevant request is judged to be the new definition request in the step 8002, it is then judged that there is a vacant capacity or not enough for execution of the process designated for the cache at the time designated in the step 8003. When it is judged there is no vacant capacity, the process is completed (step 8011) if it is judged that the process is possible in step 8009. When it is judged in the step 8003 that there is the vacant capacity of cache required at the designated time, it is then judged in the step 8004 whether the designate LU exists at the designated time or not. When such LU does not exist, the process is completed (step 8011) if it is judged 9 that the process is impossible in step 800. When such LU exists, the process is completed (step 8011) if it is judged that the process is possible in step 8005.

Figure 9:
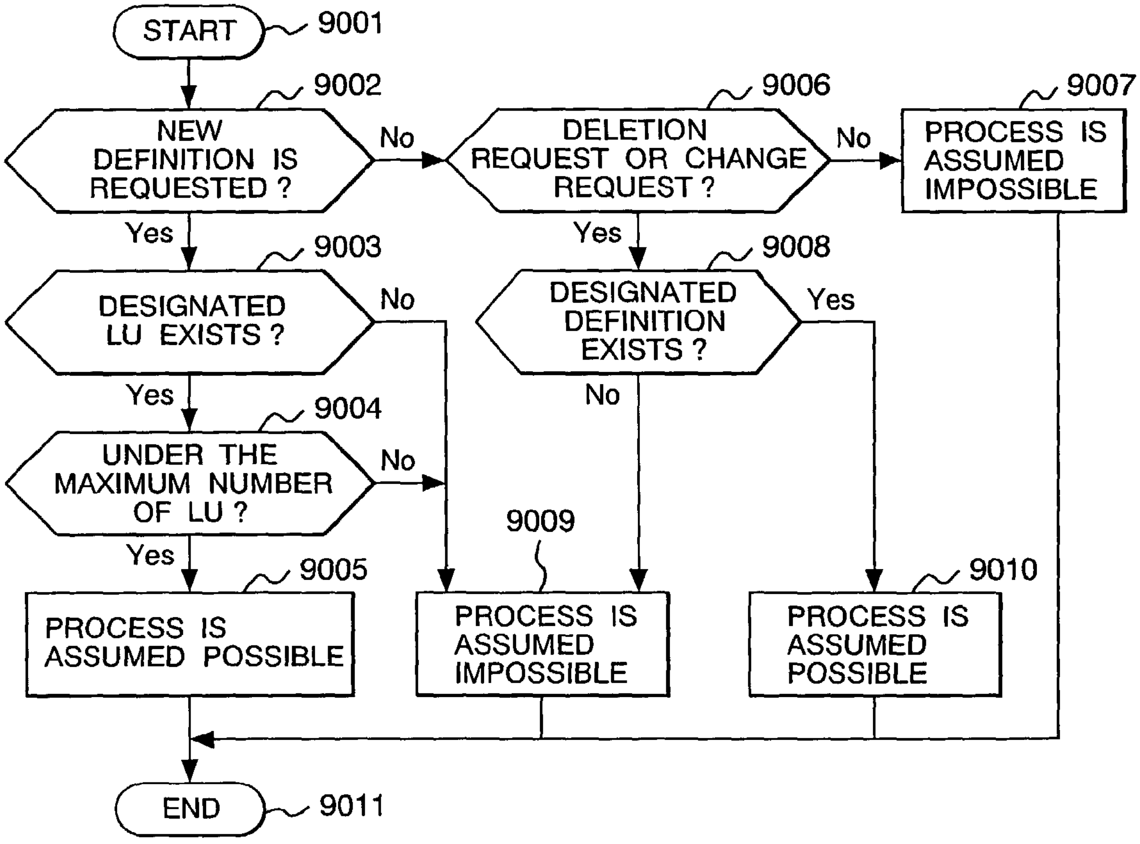
FIG. 9 illustrates a flow for judging whether the snapshot configuration change schedule change request may be processed or not in the first embodiment of the present invention.

FIG. 9 illustrates a flow of the process in the step 5013 of FIG. 5. When the process starts (step 9001), it is judged whether the relevant request is the new definition request of the snapshot or not. When the request is not the new definition request, whether it is the snapshot deletion request or snapshot setting change request is judged in the step 9006. When the request is not the deletion request or setting change request as a result of judgment, the process is completed (step 9011) if it is judged that the process is impossible in the step 9007. When the request is the deletion request or setting change request, it is judged in the step 9008 whether the designated definition exists at the designated time or not. When such definition exists, the process is completed (step 9011) if it is judged that the process is possible in the step 9010. If the definition does not exist, the process is completed (step 9011) when it is judged that the process is impossible in the step 9009.

On the other hand, when the process object request is judged in the step 9002 that it is the new definition request, it is then judged whether all LUs required for processing the relevant snapshot new definition request exist at the time designated in the step 9003 exist or not. If any one of such LUs does not exist, the process is completed (step 9011) when it is judged that the process is impossible in step 9009. When it is judged all LUs designated in the step 9003 exist, whether the number of definitions at the time designated by the snapshot is less than the maximum number of definitions or not is judged in the step 9004. When such number of definitions is less than the maximum number of definitions, the process is completed (step 9011) if it is judged that the process is possible in step 9005. When such number of definitions is not less than the maximum number of definitions, the process is completed (step 9011) when it is judged that the process is impossible in the step 9009.

For the explanation of the flow of process with reference to FIG. 6, FIG. 7, FIG. 8 and FIG. 9, the criterion of judgment may be selected to the items other than that explained above. For example, it is possible to make decision depending on the condition whether the LUN Security is defined or not for the relevant LU when the path is deleted or whether the RAID level and size of LUs are matched in the copying source and copying destination when the snapshot is newly defined.

FIG. 10 illustrates an example of the configuration change schedule 2010 of FIG. 2. A line indicates one entry and the line 10001, the line 10002, the line 10003, the line 10004, the line 10005 and the line 10006 respectively indicate one entry. The line 10007 indicates the times for executing the configuration change processes designated by each entry. The line 10008 indicates the items to be processed with each entry. The line 10009 indicates practical example of setting objects of the setting items designated by the line 10008. This setting object can be generated when a administrator sets previously the configuration change schedule in the predictable range.

In this embodiment, a controller of FIG. 2 is loaded into a storage device 1005 of FIG. 1 as an example. But, the desired block of FIG. 2 may be provided to any one of the management computer 1004, client computer 1003, storage device 1006 and storage device 1007 of FIG. 1.

Next, a second embodiment will be explained. In the first embodiment, whether change of configuration is possible or not has been judged, but in the second embodiment, the followings are further considered. In general, performance is lowered when the logical volume increases. Meanwhile, the requested performance changes depending on the time zone such as day time or at night. Therefore, it is judged whether the logical disk satisfies or not the requested performance which changes depending on time. If the logical disk does not satisfy the requested performance, control is executed to satisfy the performance as much as possible. In more practical, there is explained an example of the system which has a function to search, when the logical disk is generated, whether the predicted performance of the other logical disk defined on the parity disk to generate the logical disk becomes lower than the requested performance of the logical disk or not and to issue an alarm if it is possible even a little that the predicted performance becomes lower than the requested performance and can also designate both requested performance and predicted performance for every time zone, wherein a difference between the requested performance and predicted performance in the time zone where the predicted performance is lower than the requested performance can be reduced by using the PPC in which two stages of priority can be defined in the time zone explained above and cache residency or by setting the predicted performance to exceed the requested performance.

Figure 11:
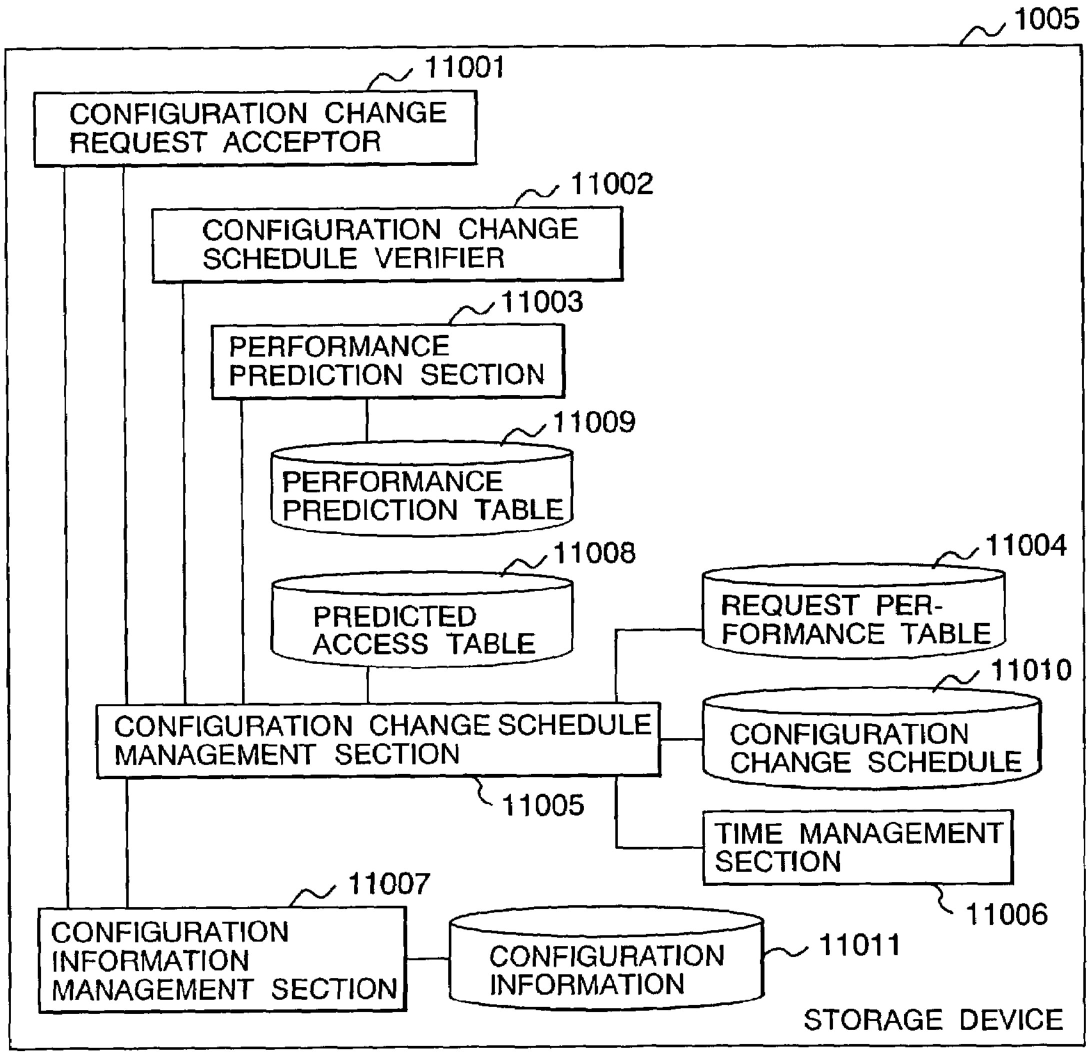
FIG. 11 illustrates a block configuration in the second embodiment of the present invention.

FIG. 11 is a block diagram for realizing this embodiment within the storage device 1005 of FIG. 1. In comparison with FIG. 2, a performance prediction section 11003, a performance prediction table 11009, a predicted access table 11008 and a requested performance table 11004 are added. The configuration change request acceptor 11001 accepts a storage device configuration change request or configuration change schedule change request from a client computer. When the received request is the configuration change request, this request is transferred to the configuration information management section 11007 and when the received request is the configuration change schedule change request, it is then transferred to the configuration change schedule management section 11005.

The configuration information management section 11007 changes the configuration information 11011 in the storage device 1005 depending on the request transferred from the configuration change acceptor 11001.

On the other hand, when the configuration change schedule management section 11005 receives the configuration change schedule change request transferred from the configuration change request acceptor 11001, it verifies using the configuration change schedule verifier 11002 whether the request may be normally processed at the time designated by the request or not. When it is judged that the request can be processed normally, the configuration change schedule management section 11005 changes the configuration change schedule 10010. Moreover, the configuration change schedule management section 11005 transmits a configuration change request to the configuration information management section 11007 depending on the configuration change schedule described in the configuration change schedule 11010 in cooperation with the time management section 11006. Moreover, the configuration change schedule management section 11005 obtains, when any one of a configuration of logical disk of the requested performance table 11004, predicted access table 11008 and configuration information 11011, LU of configuration information 11011 and configuration change schedule 11010 is changed, a configuration information 11011 from the configuration information management section 11007. The predicted performance is calculated using the predicted access table 11008 and performance prediction table for the entire part or a part of the times to change the storage configuration in the configuration change schedule 11010 using the performance prediction section 11003 and the configuration change schedule 11010 is corrected to satisfy the requested performance for each logical disk which does not satisfy the requested performance in the requested performance table 11004.

Meanwhile, the configuration information management section 11007 changes the configuration information 11011 in the storage device 1005 upon reception of the configuration change request from the configuration change schedule management section 11005. The performance prediction section 1103 obtains the predicted performance of logical disk designated by the request using the performance prediction table 11009 based on the request from the configuration change schedule management section 11005.

A flow of process of the configuration change schedule verifier 11002 is similar to the flow of process in the configuration change schedule verifier 2002 of FIG. 2. Moreover, acceptance of configuration change schedule and flow of process in the configuration change schedule management section 11005 are also similar to that of the process of FIG. 4. Moreover, the configuration change schedule 11010 is similar to that in the example of FIG. 10.

FIG. 12 illustrates an example of the requested performance table 11004 of FIG. 11. The line 12001, the line 12002, the line 12003, the line 12004 and the line 12005 indicate one entry with one line, The line 12006 indicates a time zone for designating the requested performance of each entry. The line 12007 indicates an object logical disk for describing the requested performance of each entry. The line 12008 indicates an average performance requested for each logical disk designated by the line 12007 in the time zone designated in the line 12006. As the average performance, the average access time is used here, but it may be replaced with the maximum access time or maximum transfer speed or the like. Moreover, the line 12007 is designated by the logical disk but it may be designated by LU or with a group of LU or logical disks.

FIG. 13 illustrates an example of the predicted access table 11008 of FIG. 11. The line 13001, line 13002, line 13003, line 13004 and line 13005 respectively indicate one entry with one line. The line 13006 indicates an object time zone of the predicted access of each entry, while the line 13007, the object logical disk of predicted access of each entry. The line 13008 indicates the number of predicted accesses of the logical disk designated in the line 13007 in the time zone designated in the line 13006. Here, the number of requests per unit time is indicated as the number of predicted accesses but the accesses for read and write operation may be designated individually and the total transfer size may also be included. Moreover, the logical disk is designated in the line 13007 but the UL may be also designated or a group of the LU and logical disk may also be designated.

FIG. 14 illustrates an example of the performance prediction table 11009 of FIG. 11. The line 114001, line 114002, line 14003, line 14004 and line 14005 respectively indicate one entry with one line. The line 14006 indicates the predicted performance of each entry when the requests equal to the number of requests designated in the line 14006 are issued. As the predicted performance, the average read time is used here, but it is also possible to individually designate the write and read operation times and the average prediction performance of the unit size per unit time may also be defined considering the transfer size.

Figure 15:
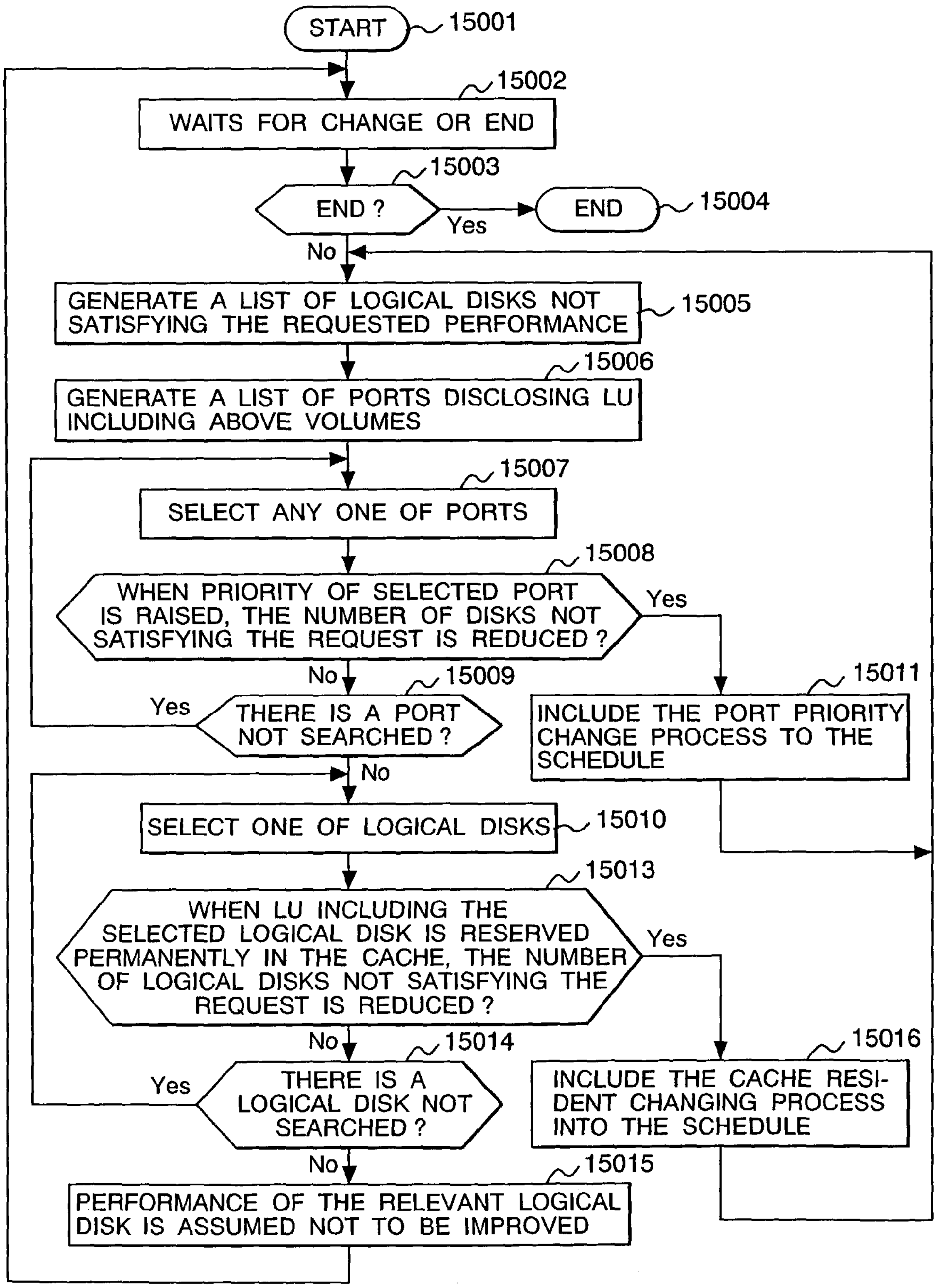
FIG. 15 illustrates a flow of process when the configuration information for the desired logical disk or path definition information of the logical disk or requested performance table of logical disk or configuration change schedule is changed in the second embodiment of the present invention.

FIG. 15 illustrates a flow of process to correct the configuration change schedule 11010 to satisfy the requested performance of the logical disk in the configuration information 11011 which does not satisfy such requested performance in the case that any one of the requested performance table 11004, logical disk configuration of configuration information 11011, path configuration of logical disk and configuration change schedule 11010 of FIG. 11 is changed. For the following explanation, it is considered as the measure to improve the performance of the logical disk to raise the priority sequence of the ports and realize cache residency of LU.

When the process starts (step 15001), the logical disk configuration of configuration information 11011 or path configuration of logical disk or configuration change schedule 11010 is changed or the process is not executed until the completion of program in the step 15002. Thereafter, it is judged in the step 15003 whether the cause of completion in the step 15002 is the end of program or not. The above cause is the end of program, the process of FIG. 15 is completed (step 15004). When it is proved in the step 15003 that the cause of the end in the step 15002 is not the end of program, a list of the logical disks which do not satisfy the requested performance, time zones in which the logical disk does not satisfy the requested performance and set of LU including the logical disk in the definition is generated in the step 15005. Here, in this embodiment, the list generated in the step 15005 does not include the logical disk for which the path is not defined. In the step 15006, a list of the ports opening the LUs which include the logical disks in the definition in the time zones in which the logical disks obtained in the step 15005 do not satisfy the performance is generated. In the step 15007, one port for which the process of the step 15008 is not executed is selected among the ports in the list generated in the step 15006. When the priority of the selected port is raised in the step 15008, it is searched whether the number of sets of the logical disks which do not satisfy the request, time zone and LU obtained in the step 15005 is reduced or not. When the number of sets is reduced, the port priority change process is built into the configuration change schedule in the step 15011 and the process returns to the step 15005. When it is judged in the step 15008 that the number of logical disks is not reduced, it is then searched in the step 15009 whether the ports which are not yet searched exist or not. When such ports exist, the process returns to the step 15007. When such ports do not exist, the process goes to the step 15010. In the step 15010, only one logical disk which does not execute the process of the step 15013 is selected from those of the list generated in the step 15005. In the step 15013, whether the number of sets of the logical disks which do not satisfy the requested performance, time zone and LU in the list generated in the step 15005 is reduced or not is judged in the step 15013 because the LU including the selected logical disks in the definition is resident in the cache. When the number of sets is judged to be reduced, the cache residency change process is built into the configuration change schedule in the step 15016. When the number of sets is judged not to be reduced, the process goes to the step 15014. In the step 15014, it is judged whether the logical disk which does not yet execute the process of the step 15013 still exist or not. When such logical disk exists, the process returns to the step 15010. When such logical disk does not exist, it is judged that performance of the relevant logical disk cannot be improved in the step 15015 and the process returns to the step 15002. When the logical disk of which performance can no longer be improved exists, it is informed to a administrator or it is outputted to the log.

Figure 16:
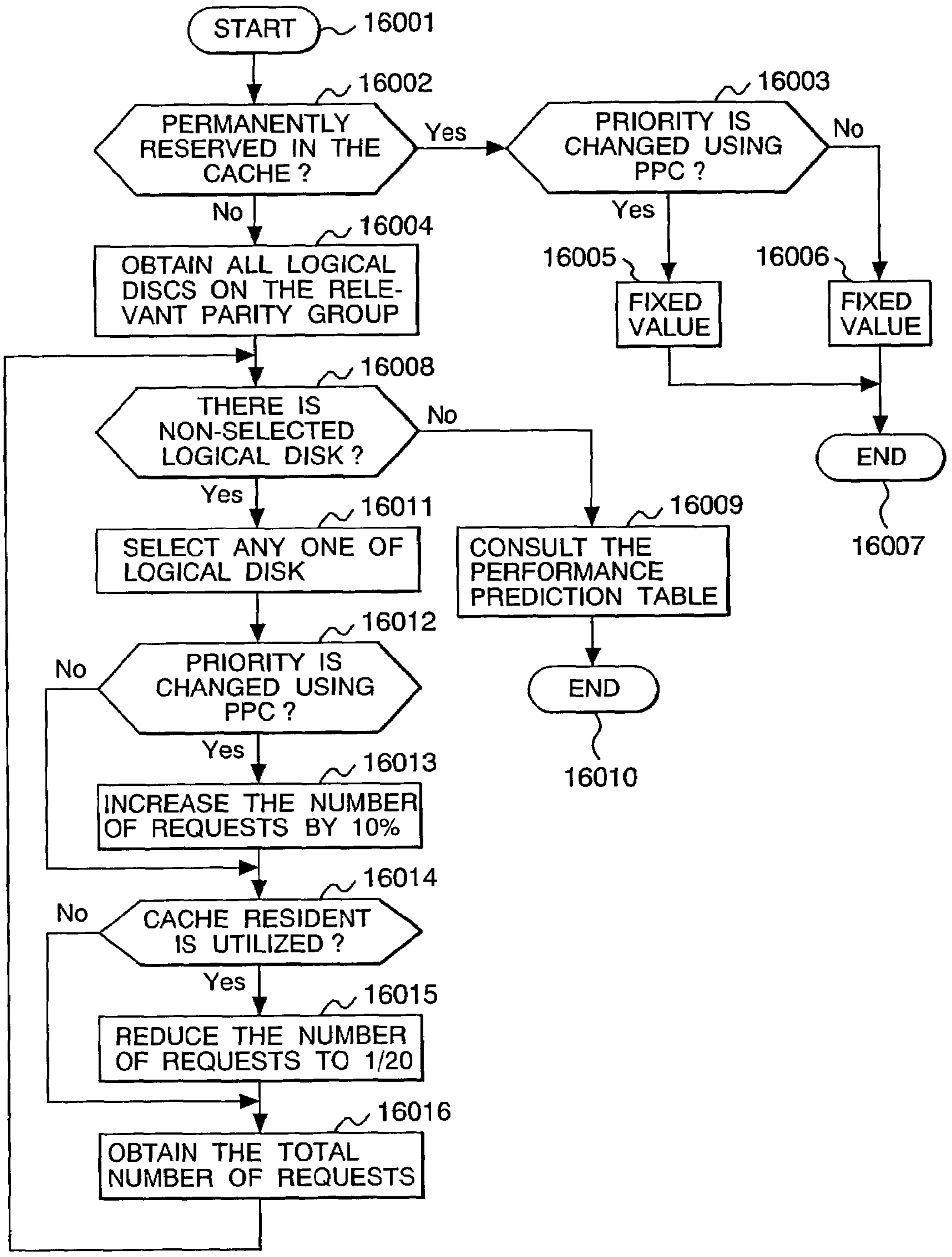
FIG. 16 illustrates a flow of the performance prediction process in the second embodiment of the present invention.

A flow of performance prediction process of the logical disk in the performance prediction section 11003 of FIG. 11 is illustrated in FIG. 16. This process predicts the performance of the designated logical disk in the designated time zone. When the process starts (step 16001), it is judged whether the LU including the logical disk to execute the performance prediction process in the definition is resident on the cache or not using the cache residency. When the LU is resident in the cache, the process goes to the step 16003. In the step 16003, it is searched whether the process priority of the port defining the LU which includes the logical disk to execute the performance prediction in the definition is raised using the PPC or not. When the process priority of the port is raised, a fixed performance value of LU which is resident in the cache when the priority is not raised is returned in the step 16006. When the priority is raised, the fixed value when the priority is changed of the LU which is resident in the cache is returned in the step 16005.

When it is judged in the step 16002 that the LU including the logical disk in the definition is not resident in the cache, all logical disks defined on the same parity group as that of the logical disk for performance prediction are obtained in the step 16004. In the step 16008, it is searched whether the logical disks which do not yet execute the process of the step 16011 exist in the logical disks obtained in the step 16004 or not. When it is judged that the logical disks which do not yet execute the process exists, only one logical disk which does not yet execute the process of the step 16008 is selected in the step 16011. In the step 16012, it is searched whether the priority of the port which opens the LU including the logical disk in the definition is changed using the PPC or not. When the priority is changed, the process goes to the step 16014. When the priority is not changed, the process goes to the step 16013. When it is judged in the step 13012 that the priority is raised, the number of average prediction requests of the logical disk is increased by 10% in order to input a temporary prediction value to predict the performance when the PPC is used. Here, the number of prediction requests means the number of prediction accesses in the time zones of the logical disk of the table of FIG. 13.

In the step 16014, it is judged whether the LU including the logical disk selected in the step 16011 in the definition is resident in the cache or not. When the LU does not resident in the cache, the process goes to the step 161016 and when the LU is resident in the cache, the process goes to the step 16015 and the number of prediction requests is reduced to 1/20. In the step 16016, the results of the calculations in the steps 16013 and 16015 of the number of prediction requests of the logical disk selected in the step 16011 are totaled for all logical disks of the step 16004. Here, the values of 10% and 1/20 do not have particular meaning. These values are only the values of example. Namely, it is possible that these values may be changed little by little in order to improve the performance.

On the other hand, when the logical disk which does not yet execute the process of the step 16008 exists in the step 16008, the performance prediction table 11003 of FIG. 11 is subtracted in the step 16009 using the total number of prediction requests of all logical disks of step 16004 calculated in the step 16016. A rate of 10% used in the step 16013 and a value 1/20 used in the step 16015 may be replaced with the values other than those used above.

In this embodiment, the process to be executed when the logical disk is generated has been explained as the object but the process when the logical disk is shifted may also be considered.

Moreover, in this embodiment, after generation of logical disk, PPC and cache residency are considered for the logical disk of which predicted performance is lower than the requested performance, but it is also possible to search that the predicted performance does not become lower than the requested performance by calculating the predicted performance when the logical disk is generated and PPC or cache residency are realized for the logical disk of which predicted performance becomes lower than the requested performance. Moreover, when it is impossible that the predicted performance does not become lower than the requested performance, it is informed to the administrator.

Moreover, in this embodiment, the priority of PPC is set in the two stages, but the PPC having the three or more stages of priority may also be adapted.

In this embodiment, an example of PPC and cache residency is explained but the path configuration of the logical disk of which predicted performance becomes lower than the requested performance may also be changed. In this case, it is also requested to change the reference LU from the side of host as required. Moreover, it is also possible to shift the logical disk of which predicted performance becomes lower than the requested performance to the other parity group by using the snapshot function or the like in order to use the logical disk of the destination group. In this case, the snapshot has to be driven at the time before the starting time of the time zone where the predicted performance becomes lower than the requested performance and change of setting must be set to the starting time.

In this embodiment, for the logical disk in which the phenomenon that the predicted performance becomes lower than the requested performance is generated, the time schedule for generation of such phenomenon is registered but it is also possible to start the configuration change process previously the fixed time by presuming the time required for the configuration change. In this case, it is possible to introduce a method that the time required for the process is previously defined for every content of configuration change as the fixed time explained above.

Figure 17:
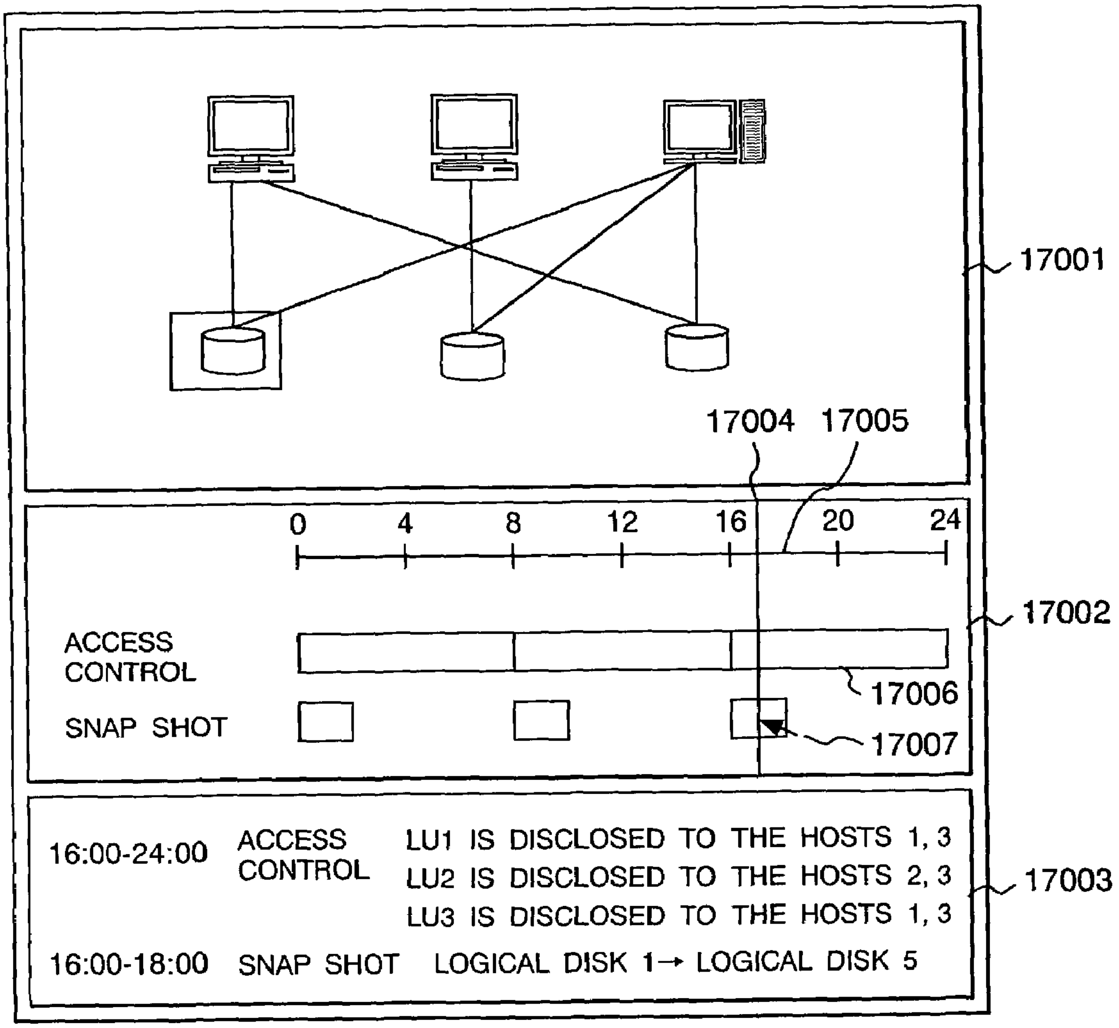
FIG. 17 illustrates an example of setting display image in the embodiments of the present invention.

Next, the GUI for observing or setting the configuration change schedule of FIG. 10 on the display screen will be explained with reference to FIG. 17. The area 17001 indicates the system configuration diagram at the designated time. While, the area 17002 indicates the configuration change schedule of the storage device indicates by the frame line of the area 17001. Setting content at each time of the time line 17005 is indicated with the configuration change content line 17006. This setting content indicates the time bones of access control and snapshot. In this figure, three access controls are set in different time zones. The time indication line 17004 may be moved with a cursor 17007 to indicate the time designated by a administrator. The area 17001 indicates a system configuration at the designated time. Setting content of the configuration change content line 17006 which is effective for the time designated by the time indication line 17004 is indicated in the area 17003. Therefore, details of the configuration content line 17006 which the time indication line 17004 crosses can be detected. When the configuration change schedule is set, for example, the input mode can be obtained by double-click of the area 17003 with the cursor and content of the area 17003 can be updated by selecting the setting menu from the keyboard or when it is displayed at the time of setting.

In above example, the configuration change schedule in regard to the configuration of the designated time is displayed but it is also possible to display the configuration change schedule of the designated resources. For example, the information pieces of LU including the relevant logical disks, cache residency of LU and PPC or the like of the port opening the LU are displayed by designating the logical disks.

Moreover, in this example, the configuration change schedule of only one storage device of those displayed in the area 17001 is displayed in the area 17002, but the configuration change schedules of the all or a part of storage devices among those displayed in the area 17001 may be displayed in the area 17002.

In the example of this embodiment, the time for configuration change is designated by a administrator, but the time for change of object in which the accesses are centralized may be extracted from the log obtained by measuring the performance of resources such as LU in the storage device and port and the setting of the cache residency and PPC may be set automatically at the relevant time. Moreover, it is also allowed to urge the administrator to add the configuration change schedule at the relevant time.

The configuration change schedule 2002 in the first embodiment and the configuration change schedule verifier 11002 in the second embodiment are not always required. Moreover, in the first and second embodiments, the configuration change of PPC, cache residency, LUN, Security, snapshot and path configuration has been explained but the configuration change may be executed depending on the schedule for the RAID level of parity group, movement of physical position of logical disk and cache assigning size for every LU and LU group or the like.

When the storage device is moved to the other SAN environment by providing the storage configuration changing apparatus of this embodiment in the storage device, the procedures for shifting management software and data can be saved.

In the first and second embodiments, when configuration information of storage device is changed depending on the schedule, it is also possible to change the configuration information only when the particular conditions are satisfied or the configuration information satisfying the particular conditions by referring to the configuration information and statistic information of the storage device at the relevant time. In this case, the conditions are designated when the schedule is designated and when the configuration information is changed depending on the schedule (immediately before the step 4009 of FIG. 4), whether the conditions are satisfied or not is judged and the configuration information satisfying the conditions is selected.

As an example of executing the processes depending on the particular conditions, there is provided a method that the port priority is changed when the threshold value of the average number of requests per unit time to the relevant port is equal to or larger than the prejudged value or less than such prejudged value in the schedule to change the port priority at the designated time. As the other example of the conditions, the remaining capacity of cache is equal to the prejudged value or less or a difference between the number of maximum assignment of paths and the present total number of assignment of paths is equal to the prejudged value or less. As an example of selecting and processing the configuration information satisfying the conditions, there is provided a method that the cache is assigned to LU which shows the largest number of access requests per unit time at the relevant time in the schedule to assign the cache at the particular time.

According to the present invention, configuration content of the storage device may be changed depending on the job profile which changes from time to time.

What is claimed is:

1. A storage configuration changing apparatus installed in a computer system in which one or more storage devices and one or more client computers using said storage devices are connected via a network, comprising:

storage device configuration information storage means for storing configuration information from client computers indicating a configuration of logical disk units within said storage devices;

a configuration change schedule including a schedule of a time at which the configuration of at one least logical disk unit is to be changed and new configuration information corresponding to the change to be used to replace corresponding configuration information stored in said storage device configuration information storage means;

time management means for calculating, based on a current time and the time at which the configuration of the at least one logical disk unit is to be changed, a time until a change of configuration of the at least one logical disk unit is to occur;

configuration change request accepting means for receiving, from said client computers, configuration information change requests from said client computers for the logical disk units in said storage devices or configuration information change schedule change requests;

configuration change schedule verifying means for, when a configuration information change schedule change request has been received by said configuration change request accepting means, verifying whether said configuration information change schedule change request received by said configuration change request accepting means can be processed normally at a requested time or not;

configuration change schedule management means for receiving, from said configuration change request accepting means, said configuration information change schedule change request, verifying whether said configuration information change schedule change request can be processed normally using said configuration change schedule verifying means or not, changing, when said configuration information change schedule change request can be processed, said configuration change schedule by processing said configuration information change schedule change request and generating a configuration information change request depending on said configuration change schedule and the time calculated by said time management means; and configuration information management means for receiving a configuration information change request from said configuration change request accepting means or from said configuration change schedule management means in order to change a configuration of a logical disk unit and corresponding configuration information stored in said storage device configuration information storage means based on the received configuration information change request, wherein said configuration change schedule management means, upon changing of said configuration change schedule, determines whether said changing of said configuration change schedule causes performance of said at least one logical disk unit to not satisfy a requested performance, wherein said configuration change schedule management means, upon determining that the performance of said at least one logical disk unit does not satisfy the requested performance, raises a priority of a port to which said at least one logical disk unit is coupled and adds information regarding the raised priority of the port to which said at least one logical disk unit is coupled to said configuration change schedule, wherein said configuration change schedule management means, upon raising of the priority of the port to which said at least one logical disk unit is coupled, determines whether the performance of said at least one logical disk unit still does not satisfy the requested performance, and wherein said configuration change schedule management means, upon determining that the performance of said at least one logical disk unit still does not satisfy the requested performance, increases residency time of data of said at least one logical disk unit in cache and adds information regarding the increased residency time in the cache of the data of said at least one logical disk unit to said configuration change schedule.

2. A storage configuration changing apparatus according to claim 1, wherein said storage device configuration information storage means is provided within said storage device.

3. A storage configuration changing apparatus according to claim 1, wherein all or a part of said configuration change schedule, said time management means, said configuration change request accepting means, said configuration change schedule verifying means, said configuration change schedule management means and said configuration information management means are provided in said storage device.

4. A storage configuration changing apparatus according to claim 1, wherein said configuration information stored in said storage device configuration information storage means includes port process priority information which defines requested process priority for every port in said storage device and said configuration change schedule includes a schedule of a time at which port process priority information is to be changed.

5. A storage configuration changing apparatus according to claim 4, wherein all or a part of said configuration change schedule, time management means, configuration change request accepting means, configuration change schedule verifying means, configuration change schedule management means and said configuration information management means are provided in said storage device.

6. A storage configuration changing apparatus according to claim 1, wherein said configuration information stored in said storage device configuration information storage means includes path defining information for defining a path to at least one logical unit in the storage device, and said configuration change schedule includes schedule of a time at which the path defining information is to be changed.

7. A storage configuration changing apparatus according to claim 6, wherein all or a part of said configuration change schedule, time management means, configuration change request accepting means, configuration change schedule verifying means, configuration change schedule management means and said configuration information management means are provided in said storage device.

8. A storage configuration changing apparatus according to claim 1, wherein said configuration information stored in said storage device configuration information storage means includes cache assigning information of the logical disk units in the storage device, and said configuration change schedule includes a schedule of a time at which the cache assigning information is to be changed.

9. A storage configuration changing apparatus according to claim 8, wherein all or a part of said configuration change schedule, time management means, configuration change request accepting means, configuration change schedule verifying means, configuration change schedule management means and said configuration information management means are provided in said storage device.

10. A storage configuration changing apparatus according to claim 1, wherein said configuration information stored in said storage device configuration information storage means includes snapshot control information of the logical disk units in the storage devices, and the configuration change schedule includes a schedule of a time at which the snapshot control information is to be changed.

11. A storage configuration changing apparatus according to claim 10, wherein all or a part of said configuration change schedule, time management means, configuration change request accepting means, configuration change schedule verifying means, configuration change schedule management means and said configuration information management means are provided in said storage device.

12. A storage configuration changing method in a computer system in which one or more storage devices and one or more client computers using said storage devices are connected via a network, comprising the steps of:

storing, in storage device configuration information storage means, configuration information from client computers indicating a configuration of logical disk units within said storage devices;

setting a configuration change schedule including a schedule of a time at which the configuration of at one least logical disk unit is to be changed and new configuration information corresponding to the change to be used to replace corresponding configuration information stored in said storage device configuration information storage means;

calculating, by time management means, based on a current time and the time at which the configuration of the at least one logical disk unit is to be changed, a time until a change of configuration of the at least one logical disk unit is to occur;

receiving, by configuration change request accepting means, from said client computers, configuration information change requests from said client computers for the logical disk units in said storage devices or configuration information change schedule change requests;

verifying, by configuration change schedule verifying means, when a configuration information change schedule change request has been received by said configuration change request accepting means, whether said configuration information change schedule change request received by said configuration change request accepting means can be processed normally at a requested time or not;

by configuration change schedule management means, receiving from said configuration change request accepting means, said configuration information change schedule change request, verifying whether said configuration information change schedule change request can be processed normally using said configuration change schedule verifying means or not, changing, when said configuration information change schedule change request can be processed, said configuration change schedule by processing said configuration information change schedule change request and generating a configuration information change request depending on said configuration change schedule and the time calculated by said time management means;

receiving, by configuration information management means, said configuration information change request from said configuration change request accepting means or from said configuration change schedule management means in order to change a configuration of a logical disk unit and corresponding configuration information stored in said storage device configuration information storage means based on the received configuration information change request;

determining, by said configuration change schedule management means, upon changing of said configuration change schedule, whether said changing of said configuration change schedule causes performance of said at least one logical disk unit to not satisfy a requested performance;

raising, by said configuration change schedule management means, upon determining that the performance of said at least one logical disk unit does not satisfy the requested performance, a priority of a port to which said at least one logical disk unit is coupled and adding information regarding the raised priority of the port to which said at least one logical disk unit is coupled to said configuration change schedule;

determining, by said configuration change schedule management means, upon raising of the priority of the port to which said at least one logical disk unit is coupled, whether the performance of said at least one logical disk unit still does not satisfy the requested performance; and increasing, by said configuration change schedule management means, upon determining that the performance of said at least one logical disk unit still does not satisfy the requested performance, residency time of data of said at least one logical disk unit in cache and adding information regarding the increased residency time in the cache of the data of said at least one logical disk unit to said configuration change schedule.

13. A storage configuration changing method according to claim 12, wherein said storage device configuration information storage means is provided within said storage device.

14. A storage configuration changing method according to claim 12, wherein all or a part of said configuration change schedule, said time management means, said configuration change request accepting means, said configuration change schedule verifying means, said configuration change schedule management means and said configuration information management means are provided in said storage device.

15. A storage configuration changing method according to claim 12, wherein said configuration information stored in said storage device configuration information storage means includes port process priority information which defines requested process priority for every port in said storage device and said configuration change schedule includes a schedule of a time at which port process priority information is to be changed.

16. A storage configuration changing method according to claim 15, wherein all or a part of said configuration change schedule, time management means, configuration change request accepting means, configuration change schedule verifying means, configuration change schedule management means and said configuration information management means are provided in said storage device.

17. A storage configuration changing method according to claim 12, wherein said configuration information stored in said storage device configuration information storage means includes path defining information for defining a path to at least one logical unit in the storage device, and said configuration change schedule includes schedule of a time at which the path defining information is to be changed.

18. A storage configuration changing method according to claim 17, wherein all or a part of said configuration change schedule, time management means, configuration change request accepting means, configuration change schedule verifying means, configuration change schedule management means and said configuration information management means are provided in said storage device.

19. A storage configuration changing method according to claim 12, wherein said configuration information stored in said storage device configuration information storage means includes cache assigning information of the logical disk units in the storage device, and said configuration change schedule includes a schedule of a time at which the cache assigning information is to be changed.

20. A storage configuration changing method according to claim 19, wherein all or a part of said configuration change schedule, time management means, configuration change request accepting means, configuration change schedule verifying means, configuration change schedule management means and said configuration information management means are provided in said storage device.

21. A storage configuration changing method according to claim 12, wherein said configuration information stored in said storage device configuration information storage means includes snapshot control information of the logical disk units in the storage devices, and the configuration change schedule includes a schedule of a time at which the snapshot control information is to be changed.

22. A storage configuration changing method according to claim 21, wherein all or a part of said configuration change schedule, time management means, configuration change request accepting means, configuration change schedule verifying means, configuration change schedule management means and said configuration information management means are provided in said storage device.

* * * * *